(12) United States Patent
Buerger et al.

(10) Patent No.: US 12,062,185 B2
(45) Date of Patent: Aug. 13, 2024

(54) MODEL-BASED IMAGE SEGMENTATION

(71) Applicant: KONINKLIJKE PHILIPS N.V., Eindhoven (NL)

(72) Inventors: Christian Buerger, Hamburg (DE); Tobias Klinder, Uelzen (DE); Alexander Schmidt-Richberg, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 61 days.

(21) Appl. No.: 17/797,786

(22) PCT Filed: Feb. 5, 2021

(86) PCT No.: PCT/EP2021/052741
§ 371 (c)(1),
(2) Date: Aug. 5, 2022

(87) PCT Pub. No.: WO2021/160525
PCT Pub. Date: Aug. 19, 2021

(65) Prior Publication Data
US 2023/0050190 A1 Feb. 16, 2023

(30) Foreign Application Priority Data
Feb. 14, 2020 (EP) .................................... 20157424

(51) Int. Cl.
*G06T 7/149* (2017.01)
*G06T 7/11* (2017.01)
(Continued)

(52) U.S. Cl.
CPC ................ *G06T 7/149* (2017.01); *G06T 7/11* (2017.01); *G06T 7/12* (2017.01); *G06T 17/205* (2013.01);
(Continued)

(58) Field of Classification Search
None
See application file for complete search history.

(56) References Cited

U.S. PATENT DOCUMENTS

2011/0184654 A1\* 7/2011 Ben-David ............. G06F 18/00 702/19
2019/0205606 A1 7/2019 Zhou
2020/0334874 A1\* 10/2020 Phogat .................. G06T 11/001

FOREIGN PATENT DOCUMENTS

WO WO2018055066 A1 3/2018
WO WO2019105869 A1 6/2019

OTHER PUBLICATIONS

PCT International Search Report, International application No. PCT/EP2021/052741, Apr. 7, 2021.
(Continued)

*Primary Examiner* — Frank S Chen
(74) *Attorney, Agent, or Firm* — Sherry Austin

(57) ABSTRACT

A method and system for mapping boundary detecting features of at least one source triangulated mesh of known topology to a target triangulated mesh of arbitrary topology. A region of interest in a volumetric image associated with each triangle of the target triangulated mesh is provided to a feature mapping network. The feature mapping network assigns a feature selection vector to each triangle of the target triangulated mesh. The associated region of interest and assigned feature selection vector for each triangle of the target triangulated mesh are provided to a boundary detection network. A predicted boundary based on features of the associated region of interest selected by the assigned feature selection vector is obtained from the boundary detection network.

20 Claims, 6 Drawing Sheets

(51) Int. Cl.
   *G06T 7/12* (2017.01)
   *G06T 17/20* (2006.01)
(52) U.S. Cl.
   CPC ............. *G06T 2200/24* (2013.01); *G06T 2207/20081* (2013.01); *G06T 2207/20084* (2013.01); *G06T 2207/30004* (2013.01)

(56) References Cited

OTHER PUBLICATIONS

Brosch T. et al., "Deep Learning-Based Boundary Detection for Model-Based Segmentation with Application to MR Prostate Segmentation", Sep. 13, 2018, Pervasive: International Conference on Pervasive Computing; [Lecture Notes in Computer Science; Lect. Notes Computer], Springer, Berlin, Heidelberg, pp. 515-522, XP047485600.

Ecabert O. et al., "Automatic Model-Based Segmentation of the Heart in CT Images", IEEE Transactions on Medical Imaging, IEEE Service Center, Piscataway, NJ, US, vol. 27, No. 9, Sep. 1, 2008, pp. 1189-1201, XP011226714.

Peters J. et al., "Optimizing Boundary Detection Via Simulated Search with Applications to Multi-Modal Heart Segmentation", Medical Image Analysis, vol. 14, Jan. 1, 2010,pp. 70-84, XP002779236.

Orasanu E. et al., "Organ-At-Risk Segmentation in Brain MRI Using Model-Based Segmentation: Benefits of Deep Learning-Based Boundary Detectors", Nov. 23, 2018, ROBOCUP 2008: ROBOCUP 2008: Robot Soccer World Cup XII; [Lecture Notes in Computer Science; Lect.Notes Computer], Springer International Publishing, Cham, pp. 291-299, XP047497946.

Ruida C. et al., "Fully Automated Prostate Whole Gland and Central Gland Segmentation on MRI Using Holistically Nested Networks with Short Connections", Journal of Medical Imaging, vol. 6, No. 02, Jun. 5, 2019, p. 1, XP055715651.

Rad M. et al., "Feature Mapping for Learning Fast and Accurate 3D Pose Inference from Synthetic Images", 2018 IEEE/CVF Conference on Computer Vision and Pattern Recognition, IEEE, Jun. 18, 2018, pp. 4663-4672, XP033473377.

* cited by examiner

MODEL-BASED IMAGE SEGMENTATION

CROSS-REFERENCE TO PRIOR APPLICATIONS

This application is the U.S. National Phase application under 35 U.S.C. § 371 of International Application No. PCT/EP2021/052741, filed on Feb. 5, 2021, which claims the benefit of European Patent Application No. EP20157424.1, filed on Feb. 14, 2020. These applications are hereby incorporated by reference herein.

FIELD OF THE INVENTION

The invention relates to the field of model-based image segmentation, and in particular to model-based image segmentation using triangulated surface meshes.

BACKGROUND OF THE INVENTION

Model-based image segmentation is used in a range of applications to automatically segment an object from an image. For example, model-based image segmentation techniques are used in medical image processing to segment an organ, or some other body part, from a volumetric medical image.

Model-based segmentation techniques using triangulated surface meshes have proven to be fast, robust and accurate. In these techniques, a shape prior is encoded in a surface mesh, and the mesh is adapted to an image. The shape prior means that an object in an image can be segmented even if some parts of the object's boundary cannot be detected, and, since only image data close to the mesh surface is processed to adapt the mesh to the image, the image can be segmented quickly.

Traditional model-based segmentation techniques use features such as image gradients to detect the boundary of an object in an image. Recently, deep learning based techniques have been developed to improve boundary detection. Brosch, T. et al., 2018 ("Deep Learning-Based Boundary Detection for Model-Based Segmentation with Application to MR Prostate Segmentation", MICCAI (2018), pp. 512-522) describes a neural network trained to predict the boundary for each triangle of a mesh. The boundary at each triangle of a mesh is detected based on a triangle-specific combination of features.

However, since these techniques are trained to detect boundaries by assigning specific features to each triangle, they require surface meshes with a fixed topology, that is, a fixed number of vertices and triangles. This prevents any changes in topology, such as adding triangles to the mesh, removing triangles from the mesh, and otherwise re-arranging or refining the topology, as the features for triangles in a new, modified topology are not defined. Such model-based segmentation techniques therefore cannot be used to segment images where the shape of a body part differs significantly from the shape prior, due to, for example, anatomical abnormalities such as an extra vertebra, or artificial abnormalities such as screws from spinal fixation. Some body parts, such as the rectum, have such large shape flexibility that it is not possible to encode shape priors that would reliably delineate them.

There is therefore a need for a model-based segmentation technique that can use triangulated surface meshes of arbitrary topology.

SUMMARY OF THE INVENTION

The invention is defined by the claims.

According to examples in accordance with an aspect of the invention, there is provided a computer-implemented method of predicting a boundary of an object in a region of interest that comprises mapping boundary detecting features of at least one source triangulated mesh of known topology to a target triangulated mesh of arbitrary topology.

The method comprises: providing, to a feature mapping network, a region of interest in a volumetric image associated with each triangle of the target triangulated mesh; assigning a feature selection vector to each triangle of the target triangulated mesh using the feature mapping network; for each triangle of the target triangulated mesh, providing the associated region of interest and assigned feature selection vector to a boundary detection network; and for each triangle of the target triangulated mesh, obtaining a predicted boundary from the boundary detection network based on features of the associated region of interest selected by the assigned feature selection vector.

Proposed concepts are based on a proposal that triangles of meshes with different topology that have similar local image environments should have the same feature selection vector applied to them when determining the boundary at the triangle. Rather than a boundary detection network using a triangle-specific feature selection vector for each triangle, which requires a fixed mesh topology, proposed embodiments use a second network, the feature mapping network, to assign a feature selection vector to each triangle of a mesh of arbitrary topology, based on the appearance of the region of the image surrounding the triangle.

The ability to predict boundaries for a mesh of arbitrary topology means that the shape of a mesh may be adjusted to better delineate a structure in an image. Another advantage that may be provided by proposed embodiment is that, once the boundary detection network and feature mapping network have been trained, training data may not be required to use these networks for new topologies.

In some embodiments, the method may further comprise obtaining the target triangulated mesh of arbitrary topology by adding triangles to or removing triangles from a triangulated mesh of known topology. In this way, boundaries may be predicted for a mesh that has had triangles added to or removed from it, in order, for example, to locally refine the mesh to improve the delineation of a body part in a volumetric medical image, or to add structures to the mesh to include abnormalities in the shape of a body part.

In other embodiments, the method may further comprise obtaining the target triangulated mesh of arbitrary topology by obtaining a segmentation of the volumetric image using a voxel-wise segmentation technique, and generating the target triangulated mesh based on the obtained segmentation. In this way, boundaries may be obtained for structures for which there is no existing triangulated surface mesh. This allows the delineation of body parts that have a large shape flexibility, such as the rectum.

The region of interest associated with each triangle may be oriented according to the normal of the triangle. This enables the feature mapping network to assign the same feature selection vector to triangles for which the associated regions of interest look similar when oriented such that the triangles are at the same angle.

The feature mapping network may be trained using a first training algorithm configured to receive an array of training inputs and known outputs, wherein the training inputs comprise regions of interest associated with triangles of meshes of arbitrary topology and the known outputs comprise known boundaries for the regions of interest.

In some embodiments, the first training algorithm may be further configured to: assign a feature selection vector for each region of interest associated with a triangle of a mesh of arbitrary topology; for each triangle of a mesh of arbitrary topology, provide the associated region of interest and the assigned feature selection vector to the boundary detection network; for each triangle of a mesh of arbitrary topology, obtain a predicted boundary from the boundary detection network; and train weights of the feature mapping network based on the predicted boundaries from the boundary detection network and the known boundaries. In this way, the feature mapping network may be trained to learn the correspondence between a region of interest and the feature selection vector that best selects features for predicting the boundary in the region of interest.

In some embodiments, the method further comprises providing a set of standardized coordinates for each region of interest to the feature mapping network.

In some embodiments, the method may further comprise providing a relative position of each triangle of the target triangulated mesh to the feature mapping network.

The boundary detection network may be trained using a second training algorithm configured to receive an array of training inputs and known outputs, wherein the training inputs comprise training images with meshes of known topology and the known outputs comprise known boundaries. This training algorithm trains the boundary detection network to detect the boundary at a triangle of a mesh of known topology.

According to another aspect of the invention, there is provided computer-implemented method of model-based image segmentation, comprising mapping features of at least one source triangulated mesh of known topology to a target triangulated mesh of arbitrary topology, according to any previously described method, and segment an object from the volumetric image using the target triangulated mesh.

Such a proposed method may enable the segmentation of objects that cannot otherwise be segmented with existing model-based segmentation techniques. For example, model-based segmentation techniques using triangulated surface meshes of fixed topology are unsuitable for segmenting anatomical structures with abnormalities and body parts that can have a large variation in shape. By mapping features of meshes of fixed topology to a mesh of arbitrary topology, these structures can be segmented.

According to another aspect of the invention, there is provided a computer program comprising code means for implementing any previously described method when said program is run on a processing system.

According to another aspect of the invention, there is provided a processing system adapted to: provide, to a feature mapping network, a region of interest in a volumetric image associated with each triangle of a target triangulated mesh; assign a feature selection vector to each triangle of the target triangulated mesh using the feature mapping network; for each triangle of the target triangulated mesh, provide the associated region of interest and assigned feature selection vector to a boundary detection network; and for each triangle of the target triangulated mesh, obtain a predicted boundary from the boundary detection network based on features of the associated region of interest selected by the assigned feature selection vector.

In some embodiments, the processing system is further adapted to orient the region of interest associated with each triangle according to the normal of the triangle.

In some embodiments, the processing system is further adapted to provide, for each triangle of the target triangu-lated mesh, at least one of a set of standardized coordinates of the associated region of interest and a relative position of the triangle to the feature mapping network.

According to another aspect of the invention, there is provided a model-based image segmentation system, comprising: the processing system as previously described, further adapted to segment an object from the volumetric image using the target triangulated mesh, and a user interface configured to receive, from the processing system, and display the segmented image of the object.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
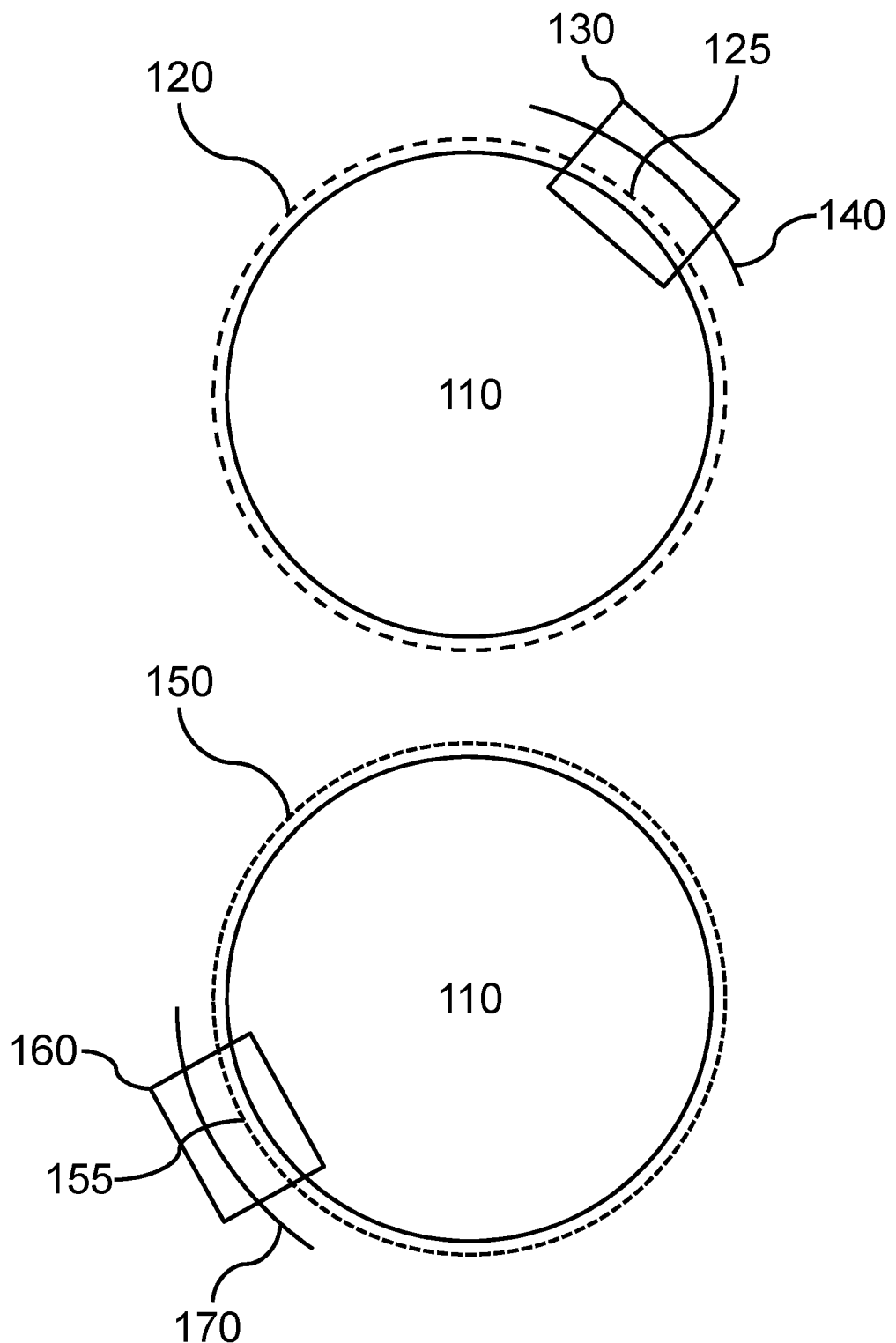
FIG. 1 is an illustration of an object segmented by two meshes of different topology.

The invention will be described with reference to the FIGS.

It should be understood that the detailed description and specific examples, while indicating exemplary embodiments of the systems and methods, are intended for purposes of illustration only and are not intended to limit the scope of the invention. These and other features, aspects and advantages of the systems and methods of the present invention will become better understood from the following description, appended claims, and accompanying drawings. It should be understood that the FIGS. are merely schematic and are not drawn to scale. It should also be understood that the same reference numerals are used throughout the FIGS. to indicate the same or similar parts.

According to a proposed concept, there is provided an approach to mapping boundary detecting features of at least one source triangulated mesh of known topology to a target triangulated mesh of arbitrary topology. A region of interest in a volumetric image associated with each triangle of the target triangulated mesh is provided to a feature mapping network. The feature mapping network assigns a feature selection vector to each triangle of the target triangulated mesh. The associated region of interest and assigned feature selection vector for each triangle of the target triangulated mesh are provided to a boundary detection network. A predicted boundary based on features of the associated region of interest selected by the assigned feature selection vector is obtained from the boundary detection network.

Illustrative embodiments may, for example, be employed in model-based image segmentation systems, such as in medical imaging analysis systems.

Embodiments may be at least partly based on the realization that the same feature selection vector may be used for triangles of meshes with different topology that have similar local environment, and that a neural network may be trained to learn the correspondence between a triangle's local environment and a feature selection vector.

FIG. 1 illustrates an object 110 segmented by two meshes of different topology. In the top image, the object 110 is segmented by the first mesh 120. A region of interest 130 associated with a triangle 125 of the first mesh 120 encompasses the triangle 125 and part of a boundary between the object 110 and a neighboring structure 140. In the bottom image, the object 110 is segmented by the second mesh 150, which has more surface triangles than, and therefore a different topology to, mesh 120. A second region of interest 160 associated with a triangle 155 of the second mesh 150 encompasses the triangle 155 and part of a boundary between the object 110 and a second neighboring structure 170.

Figure 2:
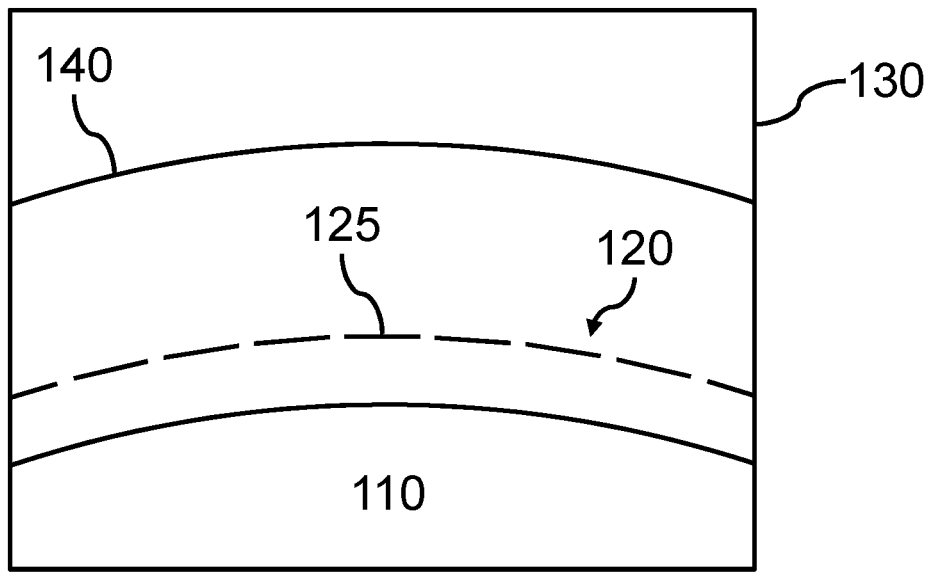
FIG. 2 is an illustration of regions of interest for triangles of the meshes of FIG. 1, oriented according to the normals of the triangles.
Figure 2:
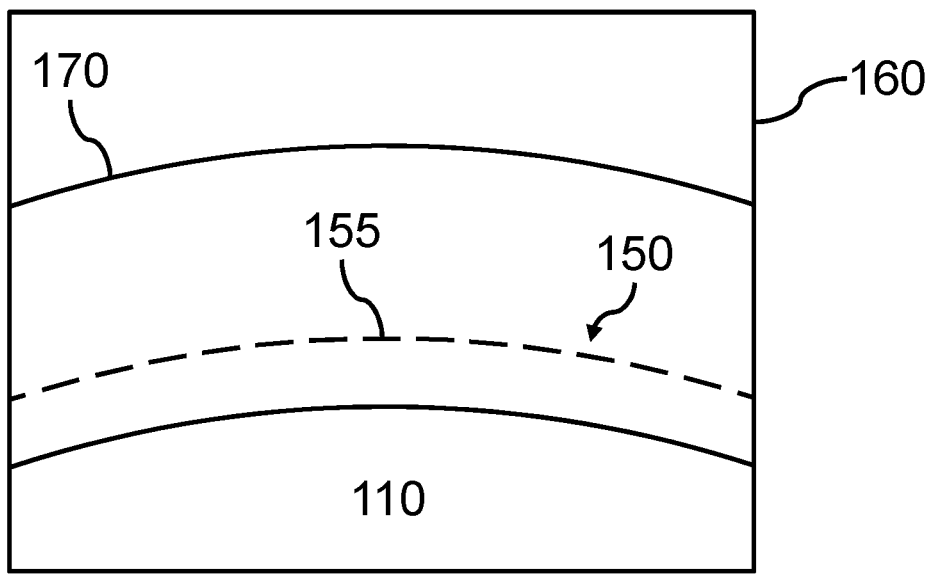

FIG. 2 illustrates the regions of interest 130 and 160 oriented according to the normals of triangles 125 and 155 respectively. It can be seen from FIG. 2 that the triangles 125 and 155 have similar associated regions of interest when oriented in the same direction. The same boundary detecting features may therefore be used to predict the boundaries at both triangles 125 and 155. However, current boundary detection networks detect the boundary at a triangle based on a triangle-specific combination of features. This means that a boundary detection network trained using mesh 120 cannot be used to detect boundaries for triangles of mesh 150.

The present invention recognizes that a boundary can detected at triangle 155 using a boundary detection network trained on mesh 120, by training a second neural network to map the boundary detecting features for triangle 125 of mesh 120 to triangle 155 of mesh 150.

Figure 3:
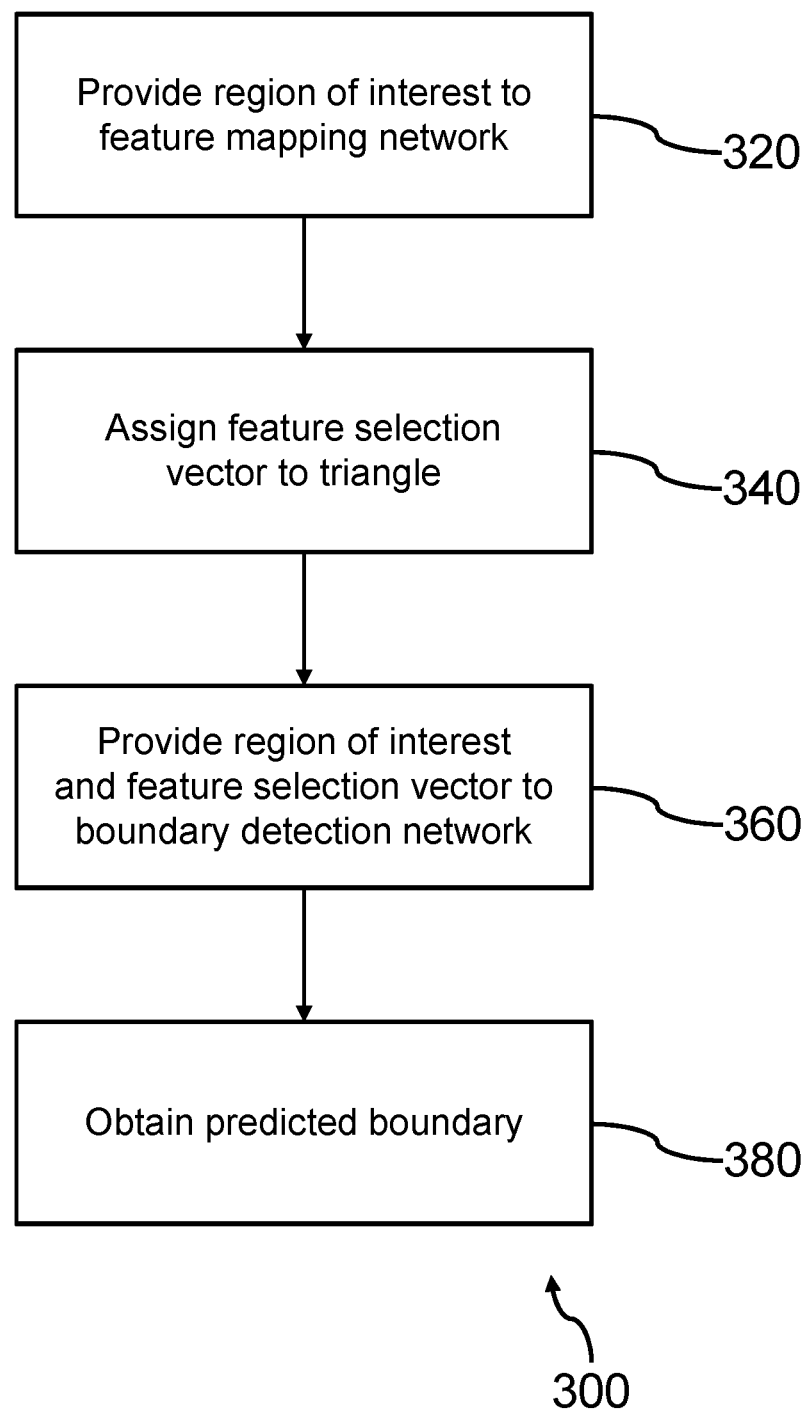
FIG. 3 is a flow diagram of a method of mapping boundary detecting features of at least one source triangulated mesh of known topology to a target triangulated mesh of arbitrary topology, according to an embodiment of the invention.

FIG. 3 illustrates a computer-implemented method 300 for mapping boundary detecting features of at least one source triangulated mesh of known topology to a target triangulated mesh of arbitrary topology, according to an embodiment of the invention. The at least one source triangulated mesh may be a mean mesh generated from N meshes of the same, known topology, where each of the N meshes is a (ground truth) segmentation of N patient images.

The method 300 begins with step 320, in which a region of interest in a volumetric image associated with each triangle of the target triangulated mesh is provided to a feature mapping network.

At step 340, the feature mapping network assigns a feature selection vector to each triangle of the target triangulated mesh based on the associated region of interest.

At step 360, the associated region of interest and assigned feature selection vector for each triangle of the target triangulated mesh are provided to a boundary detection network.

At step 380, a predicted boundary for each triangle of the target triangulated mesh is obtained from the boundary detection network, based on features of the associated region of interest selected by the assigned feature selection vector.

The target triangulated mesh may be obtained by modifying a triangulated mesh of known topology or by generating a new mesh from scratch. For example, triangles may be added to or removed from an existing shape prior encoded in an MBS model to locally refine the mesh, or to add additional structures to the mesh. Alternatively, an initial (coarse) segmentation technique, such as a voxel-wise segmentation technique, may be used to obtain an initial segmentation of the volumetric image, and the target triangulated mesh may be obtained by generating a mesh based on the initial segmentation, for example, by using marching cubes or some other mesh generation technique. Suitable initial (coarse) segmentation techniques will be apparent to the skilled person, and may include the use of a deep learning network.

The volumetric image may, for example, be a volumetric medical image. For example, are volumetric image may be a computed tomography (CT) image, a magnetic resonance (MR) image, a nuclear medicine image, such as a positron emission tomography (PET) image or a single photon emission computed tomography (SPECT) image, or a volumetric ultrasound image.

Each triangle of the target triangulated mesh is associated with a region of interest in the volumetric image. Each region of interest includes its associated triangle, part of the object that the target mesh is to delineate and part of the object's surroundings. Each region of interest may be oriented such that the associated triangles are at the same angle. For example, each region of interest may be oriented according to the normal of its associated triangle.

Each region of interest is provided to a feature mapping network. Each region of interest may be accompanied by additional information. For example, the feature mapping network may be provided with a set of standardized coordinates for each region of interest, in cases where the object to be delineated is pre-registered to a common coordinate system, such as atlas-based registration for volumetric medical images. The feature mapping network may be provided with a relative position of the triangle of the target triangulated mesh associated with each region of interest, for example spherical coordinates of each triangle or a distance vector from each triangle to the center of gravity of the mesh.

The feature mapping network is an artificial neural network trained to assign a feature selection vector to each region of interest. Artificial neural networks are a type of machine learning algorithm, that is, a self-training algorithm that processes input data in order to produce or predict output data. The input data of the feature mapping network comprises regions of interest associated with triangles of meshes of arbitrary topology and the output data comprises assigned feature selection vectors.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a neural network are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. For example, weightings of the mathematical operation or each neuron may be modified until the error converges. This is commonly known as a supervised learning technique. Known methods of modifying a neural network include gradient descent, backpropagation algorithms and so on.

The feature mapping network may be trained using training input data entries corresponding to regions of interest associated with triangles of meshes of arbitrary topology, and training output data entries corresponding to known boundaries for the regions of interest. The training dataset may therefore comprise a set of training images with adapted meshes of arbitrary topology and annotated to delineate the boundaries of objects in the images.

Figure 4:
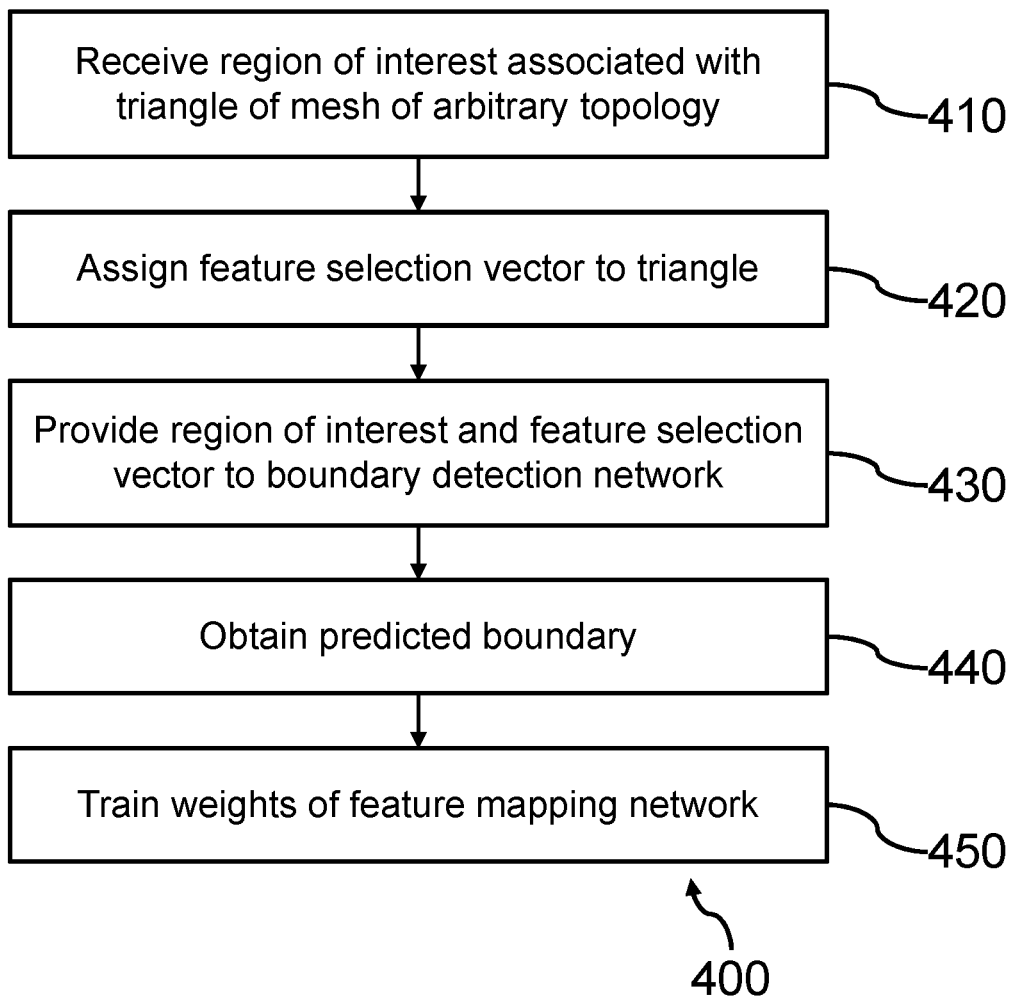
FIG. 4 is a flow diagram of a method of training a feature mapping network, according to an embodiment of the invention.

FIG. 4 illustrates a computer-implemented method 400 for training the feature mapping network, according to an embodiment of the invention.

The method 400 begins with step 410, in which the feature mapping network receives regions of interest associated with triangles of meshes of arbitrary topology from the training dataset. The regions of interest may be oriented such that their associated triangles are at the same angle. At step 420, for each region of interest, the feature mapping network assigns a feature selection vector to the triangle associated with the region of interest.

At step 430, the associated region of interest and assigned feature selection vector for each triangle is provided to the boundary detection network.

At step 440, a predicted boundary for each triangle is obtained from the boundary detection network. The boundary detection network predicts the boundary at each triangle based on features of the associated region of interest selected by the assigned feature selection vector.

At step 450, weights of the feature mapping network are trained based on the obtained predicted boundaries and the known boundaries from the annotations on the images comprising the training dataset. This step may comprise calculating the distance between each predicted boundary and its corresponding known boundary, and training weights of the feature mapping network based on the calculated distance.

These steps may be repeated until the boundaries predicted by the boundary detection network, using the feature selection vector assigned by the feature mapping network, are sufficiently similar to their corresponding known boundaries (for example, until they are within 1% of each other).

Returning to FIG. 3, the feature selection vector assigned to each triangle of the target triangulated mesh by the trained feature mapping network in step 340 is provided to the boundary detection network, along with the associated region of interest for each triangle, in step 360.

The boundary detection network is a second artificial neural network that is trained to predict a boundary in a volumetric image at a triangle of a mesh of known topology based on features of the image selected by a triangle-specific feature selection vector.

The boundary detection network may be trained using training input data entries corresponding training images with meshes of at least one known topology, and training output data entries corresponding to known boundaries in the training images. The training dataset may therefore comprise a set of training images with adapted meshes of known topology and annotated to delineate the boundaries of objects in the images. The training images may be the same images used for training the feature mapping network, but with meshes of known topology rather than arbitrary topology adapted to them. The boundary detection network may be trained using the method described in Brosch, T. et al., 2018.

In this way, the source mesh of known topology may be considered to be a mean mesh generated from all N meshes of the same, known topology used to train the boundary detection network, and the features assigned to each triangle of the source mesh are generated by training features over all N meshes. The source mesh of known topology is therefore a representation of all meshes of the known topology used to train the boundary detection network, and the features assigned to each triangle of the source mesh are the features that represent the best match for that triangle over all N meshes.

In step 380, a predicted boundary is obtained for each triangle of the target triangulated mesh of arbitrary topology from the boundary detection network. The boundary detection network is able to use the feature selection vectors specific to triangles of the meshes of known topology used to train the boundary detection network to select features to predict boundaries at triangles of the target mesh of arbitrary topology, since the feature mapping network has determined which of these feature selection vectors would best select the features to use to predict the boundary at each triangle of the target triangulated mesh.

In other words, the feature mapping network maps the triangle-specific feature selection vectors to the target triangulated mesh, and the boundary detection network uses the mapped feature selection vectors to select which features to use to determine the boundary at each triangle of the target triangulated mesh. The boundary detection network then predicts the boundary based on the selected features of the region of interest associated with each triangle of the target mesh.

Figure 5:
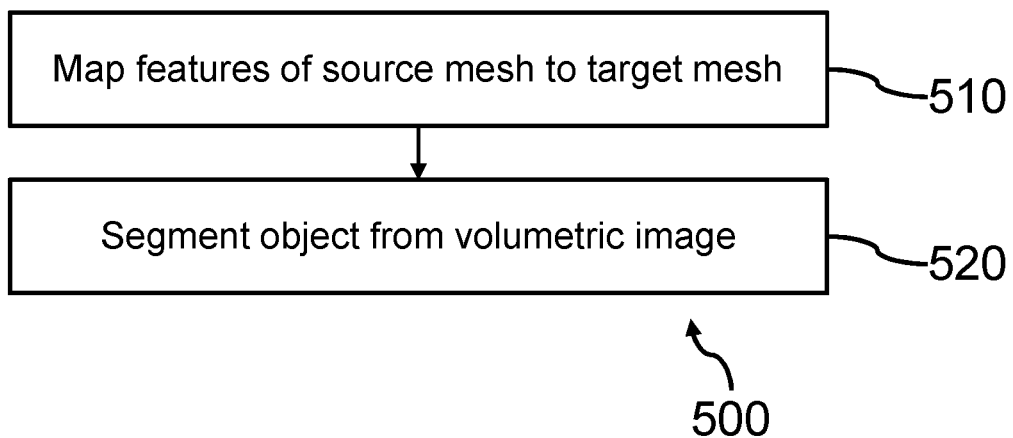
FIG. 5 is a flow diagram of a method of model-based image segmentation, according to an embodiment of the invention.

FIG. 5 illustrates a computer-implemented method 500 of model-based image segmentation, according to an embodiment of the invention.

The method begins with step 510, in which features of at least one source triangulated mesh of known topology are mapped to a target triangulated mesh of arbitrary topology, according to any previously described method.

At step 520, the target triangulated mesh is used to segment an object from the volumetric image. For example, when the volumetric image is a volumetric medical image, the target triangulated mesh may be used to segment an organ or some other body part from the volumetric medical image. Methods of using a triangulated mesh to segment an object from a volumetric image are well-known and will be apparent to the skilled person.

Figure 6:
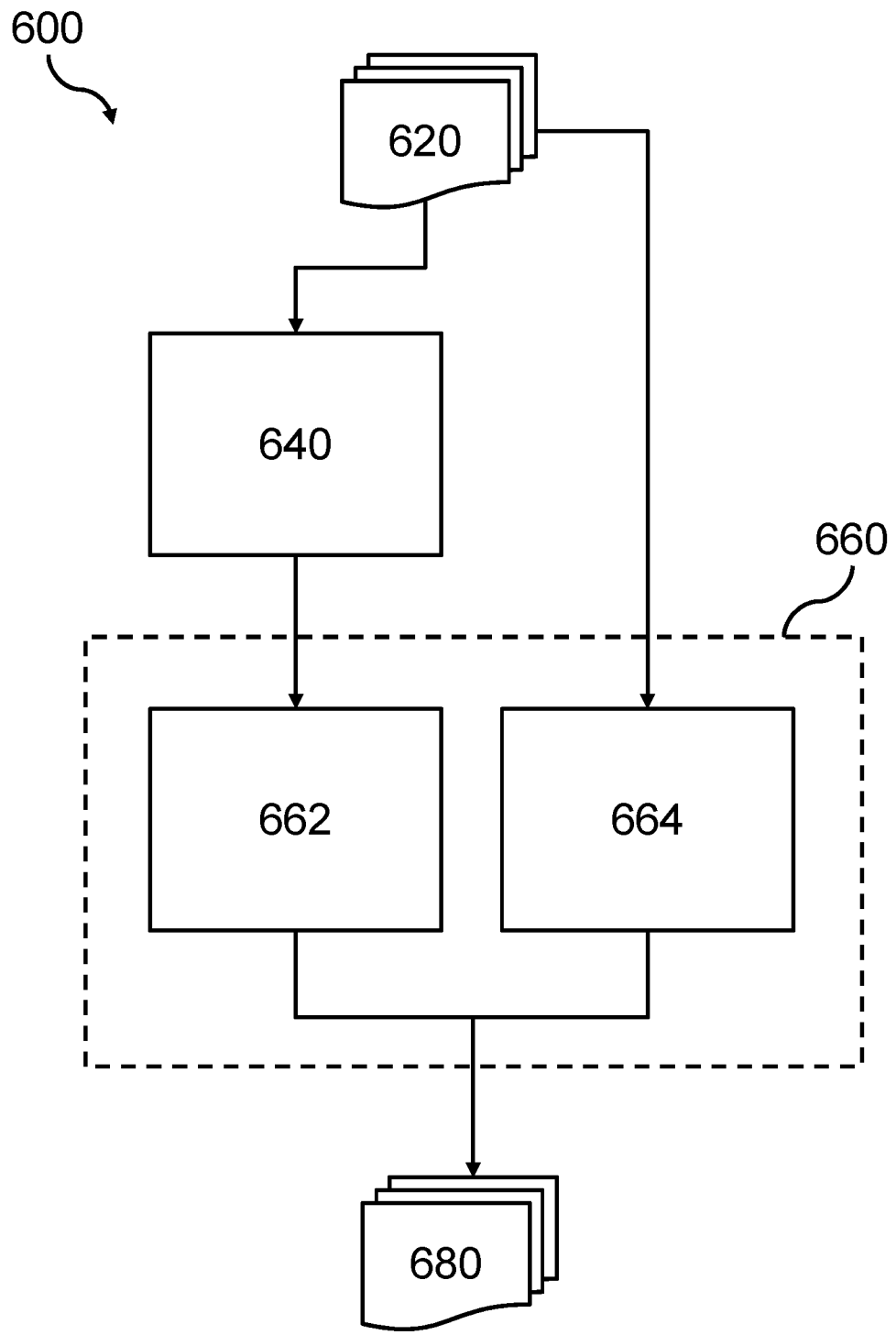
FIG. 6 is a diagram of a processing system, according to an embodiment of the invention.

FIG. 6 illustrates a processing system 600, according to an embodiment of the invention. The processing system 600 comprises a feature mapping network 640, and a boundary detection network 660.

For each triangle of a target triangulated mesh, an associated region of interest 620 of a volumetric image is provided to the feature mapping network 640, which assigns a feature selection vector 662 to each triangle based on its associated region of interest 620.

The associated region of interest 620 and assigned feature selection vector 662 for each triangle of the target triangulated mesh are provided to the boundary detection network 660. The boundary detection network 660 uses features 664 of the associated region of interest 620 selected by the assigned feature selection vector 662 to determine a predicted boundary 680 for each triangle of the target triangulated mesh.

In some embodiments, the processing system 600 is further adapted to orient the region of interest 620 associated with each triangle such that each triangle is at the same angle. For example, the processing system may be adapted to orient the region of interest 620 associated with each triangle according to the normal of the triangle.

In some embodiments, the processing system 600 is further adapted to provide additional information to the feature mapping network 640. For example, the processing system 600 may be adapted to provide a set of standardized coordinates for each region of interest 620 to the feature mapping network 640, and/or to provide a relative position of each triangle of the target triangulated mesh to the feature mapping network 640.

Figure 7:
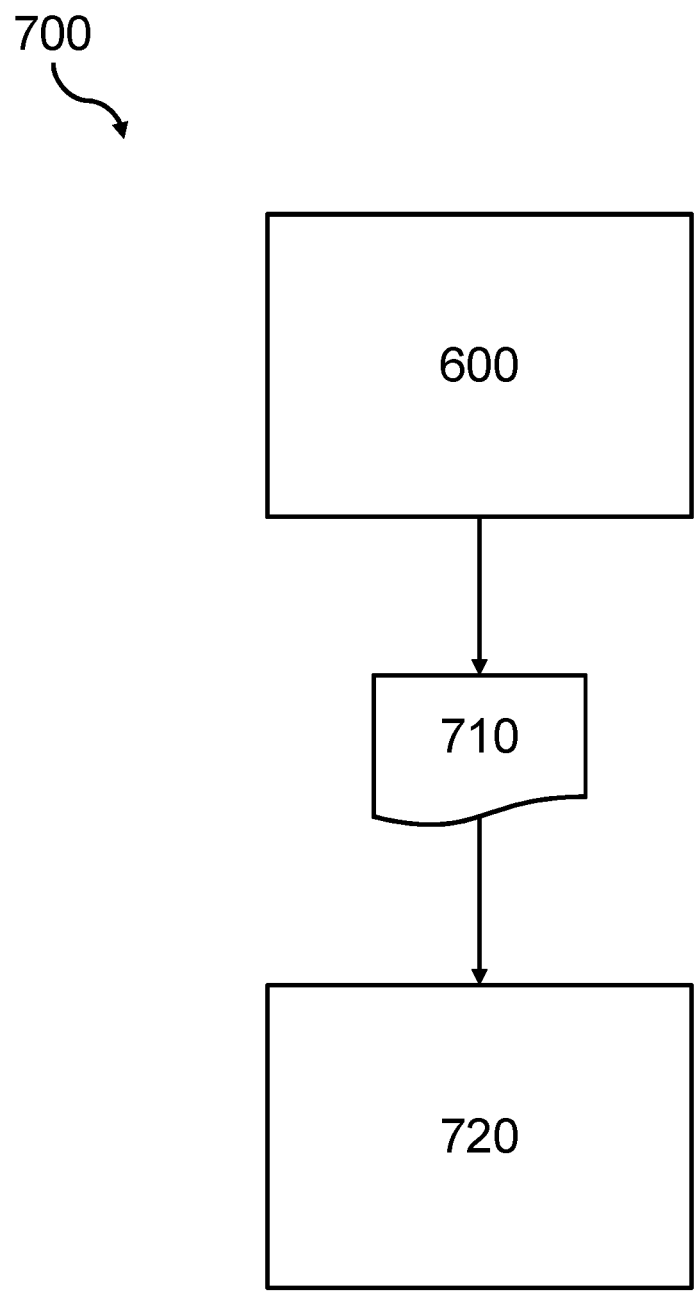
FIG. 7 is a diagram of a model-based image segmentation system, according to an embodiment of the invention.

FIG. 7 illustrates a model-based segmentation system 700, according to an embodiment of the invention. The model-based segmentation system comprises the processing system 600 as previously described, further adapted to use the target triangulated mesh to segment an object from the volumetric image, producing a segmented image 710, and a user interface 720.

The user interface 720 is configured to receive the segmented image 710 from the processing system 600 and to display the segmented image 710. The user interface may additionally receive, from the processing system 600, and display the original volumetric image and/or the target triangulated mesh.

It will be understood that the disclosed methods are computer-implemented methods. As such, there is also proposed a concept of a computer program comprising code means for implementing any described method when said program is run on a processing system.

The skilled person would be readily capable of developing a processor for carrying out any herein described method. Thus, each step of a flow chart may represent a different action performed by a processor, and may be performed by a respective module of the processing processor.

As discussed above, the system makes use of a processor to perform the data processing. The processor can be implemented in numerous ways, with software and/or hardware, to perform the various functions required. The processor typically employs one or more microprocessors that may be programmed using software (e.g. microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of predicting a boundary of an object in a region of interest, the method being suitable for mapping boundary detecting features of at least one source triangulated mesh of known topology to a target triangulated mesh of arbitrary topology, the computer-implemented method comprising:
   providing, to a feature mapping network, the region of interest in a volumetric image associated with each triangle of the target triangulated mesh, wherein the region of interest comprises each triangle and part of a boundary of the object that the target triangulated mesh is to delineate and a part of the object's surroundings, the feature mapping network is configured to assign a feature selection vector to each triangle of the target triangulated mesh based on the region of interest for selecting thereby mapping the boundary detecting features of a triangle of the at least one source triangulated mesh to the triangle of the target triangulated mesh;
   assigning the feature selection vector to each triangle of the target triangulated mesh using the feature mapping network;
   for each triangle of the target triangulated mesh, providing the associated region of interest and assigned feature selection vector to a boundary detection network, wherein the boundary detection network is configured to detect a predicted boundary for each triangle of the target triangulated mesh based on features of the region of interest selected by the assigned feature selection vector; and
   for each triangle of the target triangulated mesh, obtaining a predicted boundary from the boundary detection network based on features of the associated region of interest selected by the assigned feature selection vector.

2. The computer-implemented method of claim 1, further comprising obtaining the target triangulated mesh of arbitrary topology by adding triangles to or removing triangles from a triangulated mesh of known topology.

3. The computer-implemented method of claim 1, further comprising obtaining the target triangulated mesh of arbitrary topology by:
   obtaining a segmentation of the volumetric image using a voxel-wise segmentation technique; and generating the target triangulated mesh based on the obtained segmentation.

4. The computer-implemented method of claim 1, wherein the region of interest associated with each triangle is oriented according to the normal of the triangle.

5. The computer-implemented method of claim 1, wherein the feature mapping network is trained using a first training algorithm configured to receive an array of training inputs and known outputs, wherein the training inputs comprise regions of interest associated with triangles of meshes of arbitrary topology and the known outputs comprise known boundaries for the regions of interest.

6. The computer-implemented method of claim 5, wherein the first training algorithm is further configured to:
assign a feature selection vector for each region of interest associated with a triangle of a mesh of arbitrary topology;
for each triangle of a mesh of arbitrary topology, provide the associated region of interest and the assigned feature selection vector to the boundary detection network;
for each triangle of a mesh of arbitrary topology, obtain a predicted boundary from the boundary detection network; and
train weights of the feature mapping network based on the predicted boundaries from the boundary detection network and the known boundaries.

7. The computer-implemented method of claim 1, further comprising providing a set of standardized coordinates for each region of interest to the feature mapping network.

8. The computer-implemented method of claim 1, further comprising providing a relative position of each triangle of the target triangulated mesh to the feature mapping network.

9. The computer-implemented method of claim 1, wherein the boundary detection network is trained using a second training algorithm configured to receive an array of training inputs and known outputs, wherein the training inputs comprise training images with meshes of known topology and the known outputs comprise known boundaries.

10. A computer-implemented method of model-based image segmentation, comprising:
mapping features of at least one source triangulated mesh of known topology to a target triangulated mesh of arbitrary topology, according to the method of claim 1; and
segmenting an object from the volumetric image using the target triangulated mesh.

11. A system for predicting a boundary of an object in a region of interest of an object, comprising:
a processor; and
a memory storing a computer program, wherein the processor when executing the computer program the processor is caused to:
provide, to a feature mapping network, the region of interest in a volumetric image associated with each triangle of a target triangulated mesh wherein the region of interest comprises each triangle and part of a boundary of the object that the target triangulated mesh is to delineate and a part of the object's surroundings, the feature mapping network is configured to assign a feature selection vector to each triangle of the target triangulated mesh based on the region of interest for selecting thereby mapping the boundary detecting features of a triangle of the at least one source triangulated mesh to the triangle of the target triangulated mesh;

assign the feature selection vector to each triangle of the target triangulated mesh using the feature mapping network;
for each triangle of the target triangulated mesh, provide the associated region of interest and assigned feature selection vector to a boundary detection network, wherein the boundary detection network is configured to detect a predicted boundary for each triangle of the target triangulated mesh based on features of the region of interest selected by the assigned feature selection vector; and
for each triangle of the target triangulated mesh, obtain a predicted boundary from the boundary detection network based on features of the associated region of interest selected by the assigned feature selection vector.

12. The system of claim 11, further adapted to orient the region of interest associated with each triangle according to the normal of the triangle.

13. The system of claim 11, further adapted to provide, for each triangle of the target triangulated mesh, at least one of a set of standardized coordinates of the associated region of interest and a relative position of the triangle to the feature mapping network.

14. A model-based image segmentation system, comprising:
the system of claim 11, further adapted to segment an object from the volumetric image using the target triangulated mesh; and
a user interface configured to receive, from the system, and display the segmented image of the object.

15. A computer-implemented method of predicting a boundary of an object in a region of interest, the method being suitable for mapping boundary detecting features of at least one source triangulated mesh of known topology to a target triangulated mesh of arbitrary topology, the computer-implemented method comprising:
providing, to a feature mapping network, the regions of interest in a volumetric image respectively associated with triangles of the target triangulated mesh, wherein the region of interest comprises at least one of the triangles and part of a boundary of the object that the target triangulated mesh is to delineate and a part of the object's surroundings, the feature mapping network is configured to respectively assign a feature selection vector to the triangles of the target triangulated mesh based on the region of interest for selecting thereby mapping the boundary detecting features of a triangle of the at least one source triangulated mesh to the triangle of the target triangulated mesh;
respectively assigning the feature selection vector to the triangles of the target triangulated mesh using the feature mapping network;
for the triangles of the target triangulated mesh, providing the respectively associated region of interest and respectively assigned feature selection vector to a boundary detection network, wherein the boundary detection network is configured to respectively detect a predicted boundary for the triangles of the target triangulated mesh based on features of the region of interest selected by the respectively assigned feature selection vector; and
for the triangles of the target triangulated mesh, respectively obtaining a predicted boundary from the boundary detection network based on features of the respectively associated region of interest selected by the respectively assigned feature selection vector.

16. A non-transitory computer readable medium comprising a computer program for implementing the method of claim 15 when said program is run on a processor.

17. The computer-implemented method of claim 15, further comprising obtaining the target triangulated mesh of arbitrary topology by adding triangles to or removing triangles from a triangulated mesh of known topology.

18. The computer-implemented method of claim 15, further comprising obtaining the target triangulated mesh of arbitrary topology by:
   obtaining a segmentation of the volumetric image using a voxel-wise segmentation technique; and
   generating the target triangulated mesh based on the obtained segmentation.

19. The computer-implemented method of claim 15, wherein the feature mapping network is trained using a first training algorithm configured to receive an array of training inputs and known outputs, wherein the training inputs comprise regions of interest respectively associated with triangles of meshes of arbitrary topology and the known outputs comprise known boundaries for the regions of interest.

20. The computer-implemented method of claim 15, further comprising respectively providing a relative position of the triangles of the target triangulated mesh to the feature mapping network.

* * * * *